(12) United States Patent
Chen

(10) Patent No.: US 9,958,647 B2
(45) Date of Patent: May 1, 2018

(54) SIX-PIECE WIDE-ANGLE LENS MODULE

(71) Applicant: KINKO-OPTICAL CO., LTD., Taichung (TW)

(72) Inventor: Sze-Ying Chen, Taichung (TW)

(73) Assignee: Kinko-Optical Co., Ltd., Taichung (TW)

( * ) Notice: Subject to any disclaimer, the term of this patent is extended or adjusted under 35 U.S.C. 154(b) by 52 days.

(21) Appl. No.: 15/253,185

(22) Filed: Aug. 31, 2016

(65) Prior Publication Data
US 2017/0102526 A1  Apr. 13, 2017

(30) Foreign Application Priority Data
Oct. 12, 2015 (TW) .............. 104133371 A

(51) Int. Cl.
*G02B 9/62* (2006.01)
*G02B 13/00* (2006.01)
(52) U.S. Cl.
CPC .......... *G02B 13/0045* (2013.01); *G02B 9/62* (2013.01)

(58) Field of Classification Search
CPC .............. G02B 13/0045; G02B 9/62
USPC ................................... 359/756, 762
See application file for complete search history.

(56) References Cited

U.S. PATENT DOCUMENTS 8,902,516 B2 * 12/2014 Asami .............. G02B 13/04
359/643

\* cited by examiner

*Primary Examiner* — William R Alexander
*Assistant Examiner* — Collin X Beatty
(74) *Attorney, Agent, or Firm* — Muncy, Geissler, Olds & Lowe, P.C.

(57) ABSTRACT

A six-piece wide-angle lens module includes, from an object side to an image side, a first lens group, an aperture and a second lens group. The first lens group consists of a negative first lens, a negative second lens and a positive third lens, each lens having an object side surface facing the object side and an image side surface facing the image side, the first lens is a meniscus lens having a convex object side surface, the second lens has a concave image side surface, the third lens has a convex object side surface. The second lens group consists of a positive fourth lens, a negative fifth lens and a positive sixth lens, the fourth lens is a biconvex lens, the fifth lens has a concave image side surface, the sixth lens has a convex object side surface, the second lens group has a positive focal length.

17 Claims, 12 Drawing Sheets

SIX-PIECE WIDE-ANGLE LENS MODULE

BACKGROUND OF THE INVENTION

1. Field of the Invention

The present invention relates generally to an optical lens, and more particularly to a six-piece optical lens having a refractive power.

2. Description of the Related Art

So-called wide-angle lens means the lens have shorter focal length and larger viewing angle which is characterized by having a long depth of field, it could accommodate wider range of scenery and increase the depth of the space of the pictures.

However, wide-angle lens is generally prone to large chromatic aberration and large field curvature, besides, the miniature image pickup lens, the aperture and yield are also the main point of the wide-angle lens design considerations, therefore, to providing a wide-angle lens which combines multiple features should be considered by the persons of ordinary skill in the art.

SUMMARY OF THE INVENTION

It is a main objective of the present invention to provide a six-piece wide-angle lens module that combine the characteristics of wide-angle, large-aperture and small field curvature.

To achieve the above objective of the present invention, a six-piece wide-angle lens module is provided, in which the lens module includes in a sequence from an object side to an image side of a first lens group, an aperture, and a second lens group. The first lens group substantially consist of, in a sequence from an object side to an image side, a first lens has a negative refractive power, a second lens has a negative refractive power and a third lens has a positive refractive power, each lens has an object side surface which faces the object side and an image side surface which faces the image side, the first lens is a meniscus lens having a convex object side surface, the second lens has a concave image side surface, the third lens has a convex object side surface. The second lens group substantially consist of, in a sequence from an object side to an image side, a fourth lens has a positive refractive power, a fifth lens has a negative refractive power, and a sixth lens has a positive refractive power, each lens has an object side surface which faces the object side and an image side surface which faces the image side, the fourth lens is a biconvex lens, the fifth lens has a concave image side surface, the sixth lens has a convex object side surface, and the second lens group having a positive focal length.

Wherein the six-piece wide-angle lens module satisfies the following relationship:

$$0.65 \leq \left|\frac{ff}{fr}\right| \leq 8.81;$$

Wherein if is a focal length of the first lens group, and fr is a focal length of the second lens group. If the aforementioned ratio is greater than 8.81, it would be difficult to achieve the result of wide-angle, on the contrary if the aforementioned ratio is less than 0.65, it would be not easy to achieve miniature image pickup lens.

Or, the six-piece wide-angle lens module also satisfies the following relationship:

$$0.52 \leq \frac{f1}{f2} \leq 1.06;$$

Wherein f1 is a focal length of the first lens, and f2 is a focal length of the second lens. When the aforementioned ratio is greater than 1.06, the result of wide-angle is not obvious, on the contrary when the aforementioned ratio is less than 0.52, it is less likely to balance the effect of tolerance, thus the yield is not easy to be increased.

Preferably, the six-piece wide-angle lens module also satisfies the following relationship:

$$1.75 \leq \frac{1CT}{2CT} \leq 2.77;$$

Wherein 1CT is a distance from the object side surface of the first lens to the aperture along an optical axis, and 2CT is a distance from the aperture to the image side surface of the sixth lens along the optical axis. If the aforementioned ratio is greater than 2.77, it would be not easy to achieve miniature image pickup lens, on the contrary if the aforementioned ratio is less than 1.75, it is not easy to improve the aberration and astigmatism.

Preferably, the six-piece wide-angle lens module also satisfies the following relationship:

$$0.73 \leq \frac{f}{f3} + \frac{f}{f4} \leq 0.94;$$

Wherein f is a focal length of the six-piece wide-angle lens module, f3 is a focal length of the third lens, and f4 is a focal length of the fourth lens. When the six-piece wide-angle lens module satisfies the aforementioned relationship, it will help to be athermalized.

Preferably, the six-piece wide-angle lens module also satisfies one of the following relationship:

$$0.07 \leq \frac{\frac{f4}{V4} + \left|\frac{f5}{V5}\right|}{f} \leq 0.16;$$

$$0.07 \leq \frac{\left|\frac{f5}{V5}\right| + \frac{f6}{V6}}{f} \leq 0.15;$$

Wherein f is a focal length of the six-piece wide-angle lens module, f4 is a focal length of the fourth lens, f5 is a focal length of the fifth lens, f6 is a focal length of the sixth lens, V4 is an Abbe number of the fourth lens, V5 is an Abbe number of the fifth lens, and V6 is an Abbe number of the sixth lens. When the six-piece wide-angle lens module satisfies at least one of the aforementioned relationship, it will help to eliminate or reduce the chromatic aberration.

Preferably, the six-piece wide-angle lens module also satisfies the following relationship:

$$0.045 \leq \left|\frac{f}{ff}\right| \leq 0.9;$$

If the aforementioned ratio is greater than 0.9, it would be not easy to compensate the defocus which caused by temperature change, on the contrary if the aforementioned ratio is less than 0.045, it would be not easy to achieve the result of wide-angle.

Preferably, the six-piece wide-angle lens module also satisfies the following relationship:

$$0.61 \leq \frac{G12}{R2} \leq 0.89;$$

Wherein G12 is a distance between the first lens and the second lens along an optical axis, R2 is radius of curvature of the image side surface of the first lens. If the aforementioned ratio is greater than 0.89, it would be prone to stray light, on the contrary if the aforementioned ratio is less than 0.61, it would be not easy to correct the aberration.

Subject to the aforementioned design, the six-piece wide-angle lens module can have low chromatic aberration, low cost, and inconspicuous stray light, thus it could improve the overall quality, and combine the characteristics of wide-angle, large-aperture and small field curvature, etc.

The following detailed description will further explain the full scope of applications for the present invention. However, it should be understood that the detailed description and specific examples, while indicating preferred embodiments of the invention, are given by way of illustration only, since various changes and modifications within the spirit and scope of the invention will become apparent to those with the proper technical knowledge from this detailed description.

BRIEF DESCRIPTION OF THE DRAWINGS

The present invention can be understood more fully by referring to the detailed description below, as well as the accompanying drawings. However, it must be understood that both the descriptions and drawings are given by way of illustration only, and thus do not limit the present invention.

DETAILED DESCRIPTION OF THE INVENTION

Figure 1:
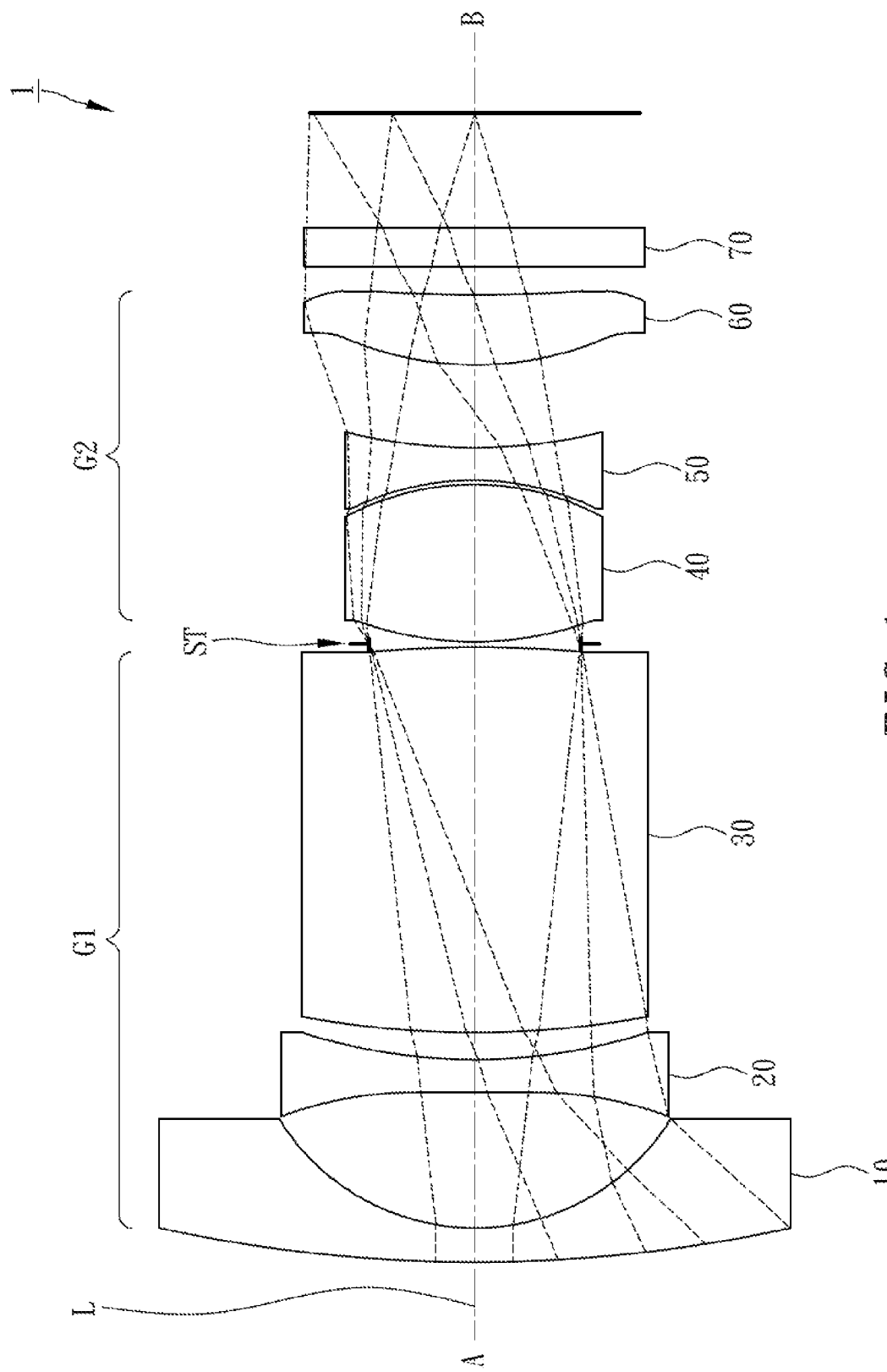
FIG. 1 is a schematic view of the first embodiment of the present invention, the dotted line means the light path.

Please refer to FIG. 1 for a six-piece wide-angle lens module 1 in accordance with the first embodiment of the present invention. The lens module 1 includes in a sequence from an object side A to an image side B: a first lens group G1, an aperture ST and a second lens group G2, the first lens group G1 substantially consists of, in a sequence from the object side A to the image side B along an optical axis L, a first lens 10, a second lens 20 and a third lens 30, the second lens group G2 substantially consists of, in a sequence from the object side A to the image side B along an optical axis L, a fourth lens 40, a fifth lens 50 and a sixth lens 60, each above-mentioned lens has an object side surface which faces the object side and an image side surface which faces the image side. CCD, CMOS or other image sensor (not shown) can be disposed at the image side B. One or more plate glasses 70 such as an optical filter and/or a cover glass can be additionally disposed between the image sensor and the sixth lens 60, in which the amount of the plate glass 70 can be adjusted subject to the requirements.

In this embodiment, the first lens 10 is a meniscus lens with a negative refractive power and has a convex object side surface and a concave image side surface.

The second lens 20 is also a meniscus lens and has a convex object side surface and a concave image side surface, both the first lens 10 and the second lens 20 have a negative refractive power, which can achieve the result of wide-angle easily and suitable for the design of large-aperture.

The third lens 30 is a biconvex lens with a positive refractive power.

The fourth lens 40 is a biconvex lens with a positive refractive power.

The fifth lens 50 is a biconcave lens with a negative refractive power.

The sixth lens 60 is a lens with a positive refractive power and has a convex object side surface and a concave image side surface, the sixth lens 60 can adjust the angle of incident lights to the image.

The optical feature data of the six-piece wide-angle lens module 1 in accordance with the first embodiment are listed in Table 1:

TABLE 1

| | Lens | Surface | Radius | Thickness | Nd | Vd | Focal length | group focal length |
|---|---|---|---|---|---|---|---|---|
| First lens group | First lens | Object surface | 44.09 | 0.6 | 1.54 | 56.07 | −5.53 | −9 |
| | | Image surface | 2.77 | 2.37 | | | | |
| | Second lens | Object surface | 12.92 | 0.62 | 1.54 | 56.07 | −10.45 | |
| | | Image surface | 3.85 | 0.48 | | | | |
| | Third lens | Object surface | 14.1 | 6.84 | 1.65 | 23.53 | 11.3 | |
| | | Image surface | −12.23 | 0.05 | | | | |
| | Aperture | | ∞ | 0.05 | | | | |
| Second lens group | Fourth lens | Object surface | 4.35 | 2.79 | 1.68 | 55.34 | 3.31 | 5.26 |
| | | Image surface | −3.46 | 0.05 | | | | |
| | Fifth lens | Object surface | −3.75 | 0.6 | 1.65 | 23.53 | −3.96 | |
| | | Image surface | 8.53 | 1.49 | | | | |
| | Sixth lens | Object surface | 3.45 | 1.21 | 1.54 | 56.07 | 7.88 | |
| | | Image surface | 16.42 | 0.5 | | | | |
| | Plate glass | Object surface | ∞ | 0.7 | 1.52 | 64.17 | | |
| | | Image surface | ∞ | 2.03 | | | | |

In the first embodiment, all the object sides and the image sides of the first lens 10, the second lens 20, the third lens 30, the fifth lens 50 and the sixth lens 60 are aspheric surfaces, whose shapes satisfy the following formula:

$$z = \frac{ch^2}{1 + [1 - (k+1)c^2h^2]^{\frac{1}{2}}} + Ah^4 + Bh^6 + Ch^8 + Dh^{10} + Eh^{12} + Fh^{14} + Gh^{14}$$

wherein z is a value of a reference position with respect to a vertex of surface along an the optical axis L, c is a reciprocal of a radius of curvature of the surface, h is a radial coordinate measured perpendicularly from the optical axis L, k is a conic constant, A is a coefficient of fourth-order aspheric surface, B is a coefficient of sixth-order aspheric surface, C is a coefficient of eighth-order aspheric surface, D is a coefficient of tenth-order aspheric surface, E is a coefficient of twelfth-order aspheric surface, F is a coefficient of fourteenth-order aspheric surface, and G is a coefficient of sixteenth-order aspheric surface.

The coefficients of the aspheric surface in the first embodiment are listed in Table 2:

TABLE 2

| Lens | Surface | k | A | B | C | D | E | F | G |
|---|---|---|---|---|---|---|---|---|---|
| First lens | Object surface | 0 | 0.002544 | −0.000142 | 0.000003 | 0 | 0 | 0 | 0 |
| | Image surface | −1.007595 | 0.004406 | 0.000198 | 0.000082 | −0.00001 | 0 | 0 | 0 |
| Second lens | Object surface | 0 | −0.026333 | 0.003412 | −0.000236 | 0.000007 | 0 | 0 | 0 |
| | Image surface | 0 | −0.021387 | 0.000842 | 0.000253 | −0.000023 | 0 | 0 | 0 |
| Third lens | Object surface | 0 | 0.003892 | −0.002106 | 0.000405 | −0.000025 | 0 | 0 | 0 |
| | Image surface | 0 | 0.001674 | 0.000584 | −0.000238 | 0.000067 | 0 | 0 | 0 |
| Fifth lens | Object surface | −0.794385 | 0.001207 | −0.000392 | −0.000369 | 0.000062 | −0.000003 | 0 | 0 |
| | Image surface | 0 | 0.002058 | 0.001341 | −0.000466 | 0.000056 | 0 | 0 | 0 |
| Sixth lens | Object surface | 0 | −0.009916 | 0.000551 | −0.000212 | 0.000025 | −0.000003 | 0 | 0 |
| | Image surface | 2.094386 | −0.002731 | −0.00029 | −0.000014 | −0.000012 | 0 | 0 | 0 |

Subject to the afore-mentioned design, the total focal length f of the present embodiment is 2.29 mm, the total length TTL thereof is 20.38 mm, the angle of view is 122 degrees, and the f-number is 2.0.

Figure 1A:
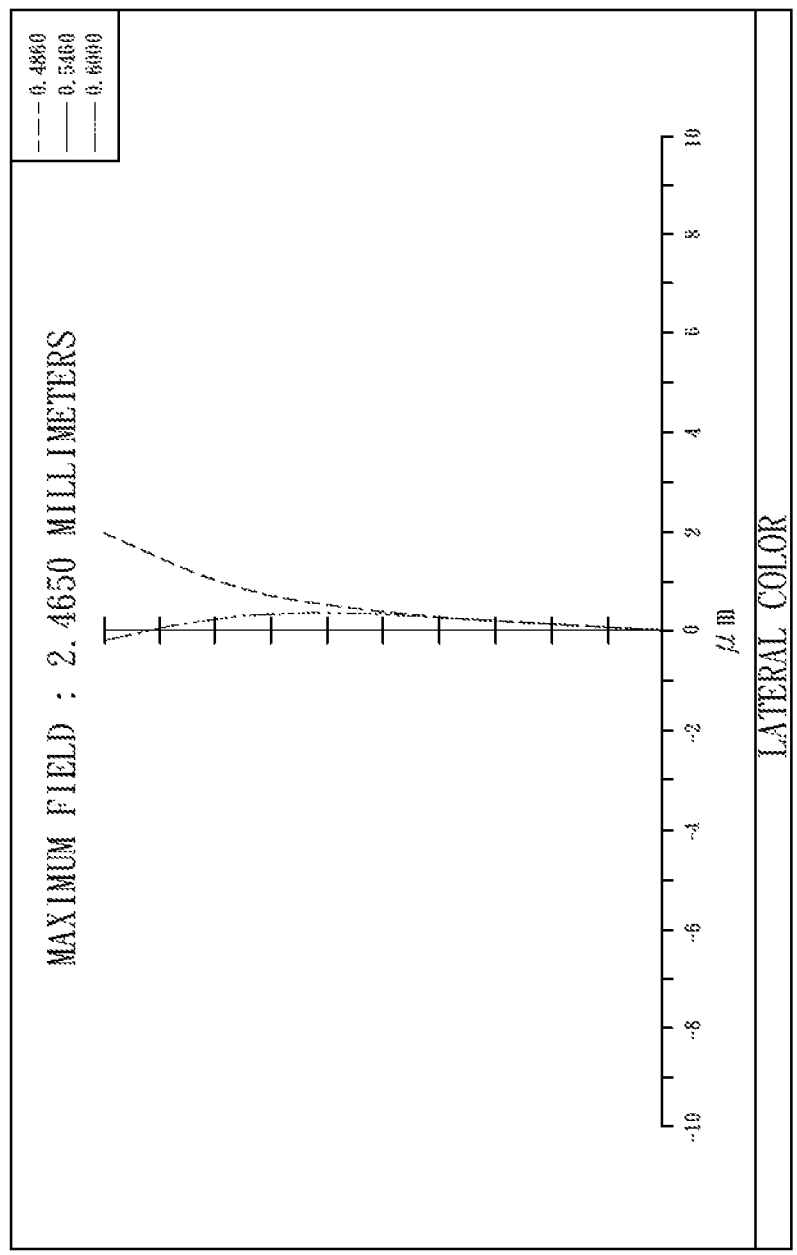
FIG. 1A is a diagram showing the lateral chromatic aberration of the lens module in accordance with the first embodiment of the present invention.
Figure 1B:
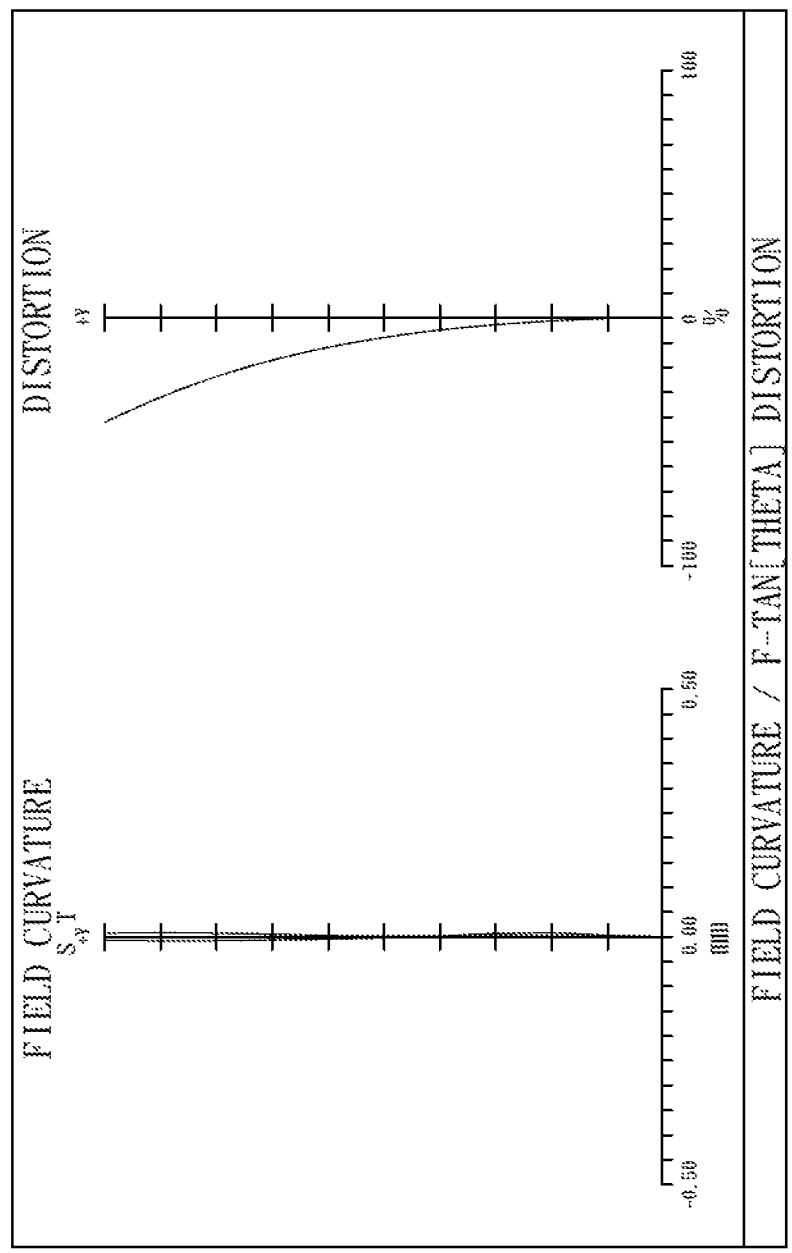
FIG. 1B is a diagram showing the field curvature and the distortion of the lens module in accordance with the first embodiment of the present invention.

At this point, the absolute value of the ratio of the focal length if of the first lens group G1 to the focal length fr of the second lens group G2 is 1.711, the ratio of the focal length f1 of the first lens 10 to the focal length f2 of the second lens 20 is 0.529, the ratio of a distance 1CT from the object side surface of the first lens 10 to the aperture ST along the optical axis L to a distance 2CT from the aperture ST to the image side surface of the sixth lens 60 along the optical axis L is 1.771, the value of $$\frac{f}{f3} + \frac{f}{f4}$$

is 0.895, the value of $$\frac{\frac{f4}{V4} + \left|\frac{f5}{V5}\right|}{f}$$

is 0.1, the value of $$\frac{\left|\frac{f5}{V5}\right| + \frac{f6}{V6}}{f}$$

is 0.135, the value of $$\left|\frac{f}{ff}\right|$$

is 0.25, the value of $$\frac{G12}{R2}$$

is 0.86, so that the six-piece wide-angle lens module 1 has smaller aberration, chromatic aberration, field curvature, less stray light, the athermalized characteristic, and can achieve the result of wide-angle, large-aperture and miniature image pickup lens, balance the effect of tolerance, increase the yield, compensate the defocus which caused by temperature change, in which the diagram of the lateral chromatic aberration is shown as FIG. 1A, and diagram of the field curvature and the distortion of the lens module is shown as FIG. 1B.

Figure 2:
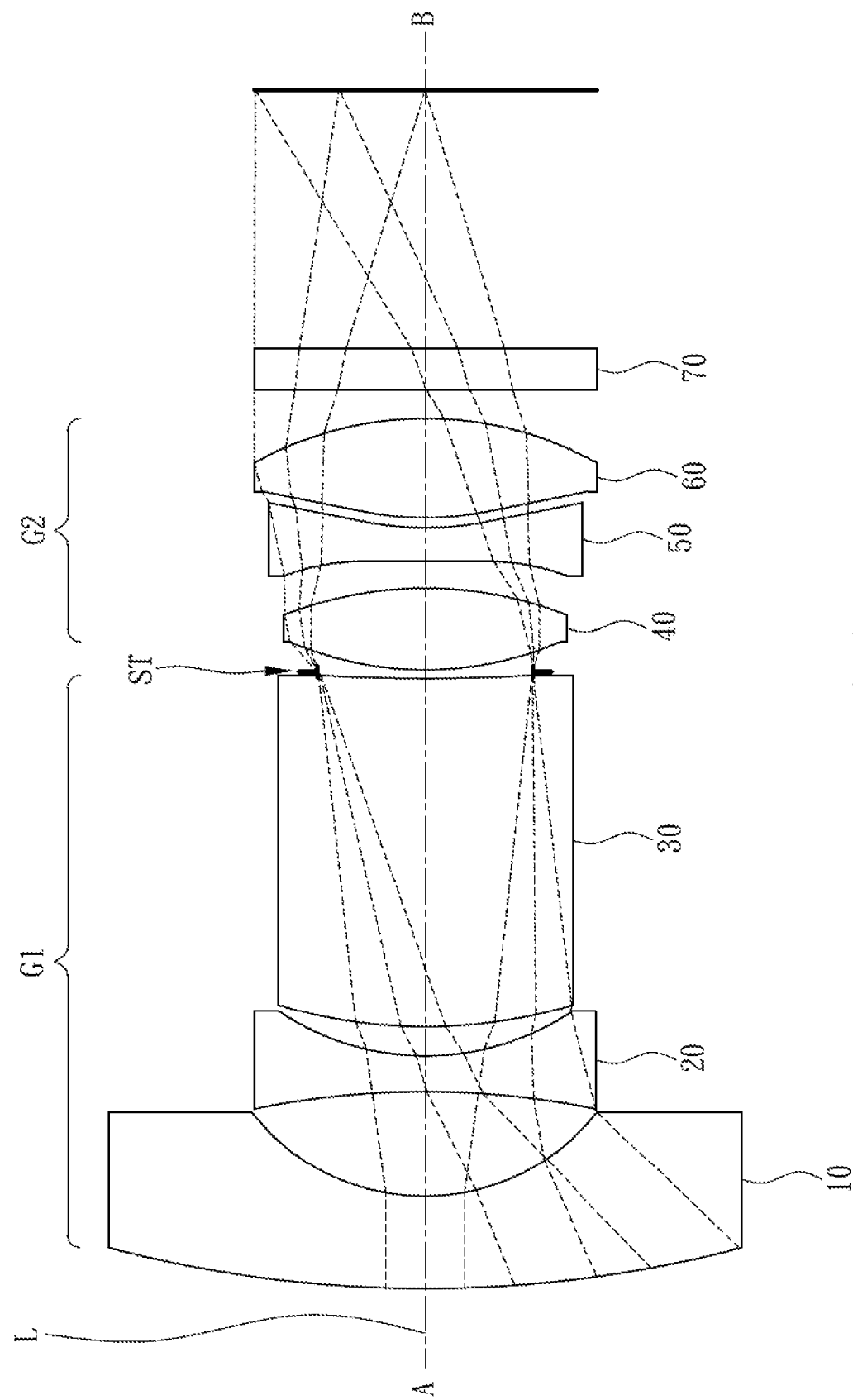
FIG. 2 is a schematic view of the second embodiment of the present invention, the dotted line means the light path.

Please refer to FIG. 2 for the second embodiment of the present invention, the lens configuration is similar to the first embodiment, the difference is: the second lens 20 has a concave object side surface, the third lens 30 has a concave image side surface, the fifth lens 50 has a convex object side surface, and the sixth lens 60 has a convex image side surface in this embodiment.

The optical feature data of the six-piece wide-angle lens module 1 in accordance with the second embodiment are listed in Table 3:

TABLE 3

| | Lens | Surface | Radius | Thickness | Nd | Vd | Focal length | Group focal length |
|---|---|---|---|---|---|---|---|---|
| First lens group | First lens | Object surface | 15.48 | 1.55 | 1.78 | 49.6 | −4.8 | −2.57 |
| | | Image surface | 2.87 | 1.77 | | | | |
| | Second lens | Object surface | −8.88 | 0.6 | 1.54 | 56.07 | −4.57 | |
| | | Image surface | 3.47 | 0.49 | | | | |
| | Third lens | Object surface | 5.98 | 5.92 | 1.86 | 24.8 | 8.47 | |
| | | Image surface | 18 | 0.12 | | | | |
| | Aperture | | ∞ | 0.05 | | | | |
| Second lens group | Fourth lens | Object surface | 3.91 | 1.36 | 1.54 | 56.07 | 5.01 | 3.91 |
| | | Image surface | −7.59 | 0.45 | | | | |
| | Fifth lens | Object surface | 9.92 | 0.6 | 1.65 | 23.53 | −6.19 | |
| | | Image surface | 2.78 | 0.17 | | | | |
| | Sixth lens | Object surface | 3.33 | 1.67 | 1.54 | 56.07 | 3.83 | |
| | | Image surface | −4.45 | 0.5 | | | | |
| | Plate glass | Object surface | ∞ | 0.7 | 1.52 | 64.17 | | |
| | | Image surface | ∞ | 4.37 | | | | |

In the second embodiment, all the object sides and the image sides of the second lens 20, the fourth lens 40, the fifth lens 50 and the sixth lens 60 are aspheric surfaces, whose shapes satisfy the following formula:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

wherein z is a value of a reference position with respect to a vertex of surface along an the optical axis L, c is a reciprocal of a radius of curvature of the surface, h is a radial coordinate measured perpendicularly from the optical axis L, k is a conic constant, A is a coefficient of fourth-order aspheric surface, B is a coefficient of sixth-order aspheric surface, C is a coefficient of eighth-order aspheric surface, D is a coefficient of tenth-order aspheric surface, E is a coefficient of twelfth-order aspheric surface, F is a coefficient of fourteenth-order aspheric surface, and G is a coefficient of sixteenth-order aspheric surface.

The coefficients of the aspheric surface in the second embodiment are listed in Table 4:

TABLE 4

| Lens | Surface | k | A | B | C | D | E | F | G |
|---|---|---|---|---|---|---|---|---|---|
| Second lens | Object surface | 0 | 0.001714 | −0.000155 | 0.000021 | −0.000001 | 0 | 0 | 0 |
| | Image surface | 0 | 0.001872 | 0.000023 | 0.000025 | 0.000005 | 0 | 0 | 0 |
| Fourth lens | Object surface | 0 | −0.002322 | −0.000223 | 0.000056 | −0.000017 | 0 | 0 | 0 |
| | Image surface | 0 | −0.017078 | 0.002597 | −0.00019 | −0.000004 | 0 | 0 | 0 |
| Fifth lens | Object surface | −1.511465 | −0.04511 | 0.006009 | −0.000164 | −0.000117 | 0.000018 | 0 | 0 |
| | Image surface | 0 | −0.05678 | 0.01233 | −0.002078 | 0.000174 | −0.000005 | 0 | 0 |
| Sixth lens | Object surface | 0 | −0.029857 | 0.005278 | −0.000773 | 0.000042 | 0 | 0 | 0 |
| | Image surface | −0.968058 | −0.002835 | 0.000081 | 0.000009 | −0.000001 | 0 | 0 | 0 |

Subject to the afore-mentioned design, the total focal length f of the present embodiment is 2.3 mm, the total length TTL thereof is 20.32 mm, the angle of view is 130 degrees, and the f-number is 2.0.

Figure 2A:
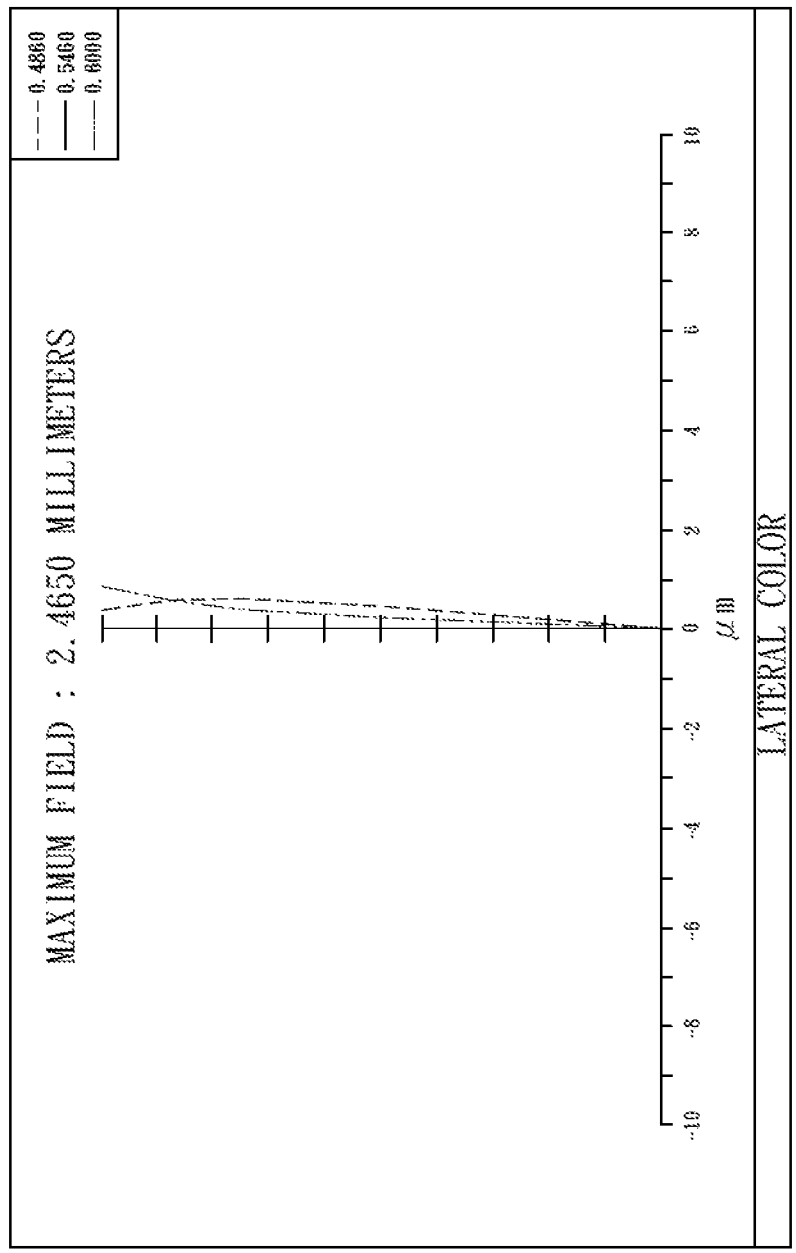
FIG. 2A is a diagram showing the lateral chromatic aberration of the lens module in accordance with the second embodiment of the present invention.
Figure 2B:
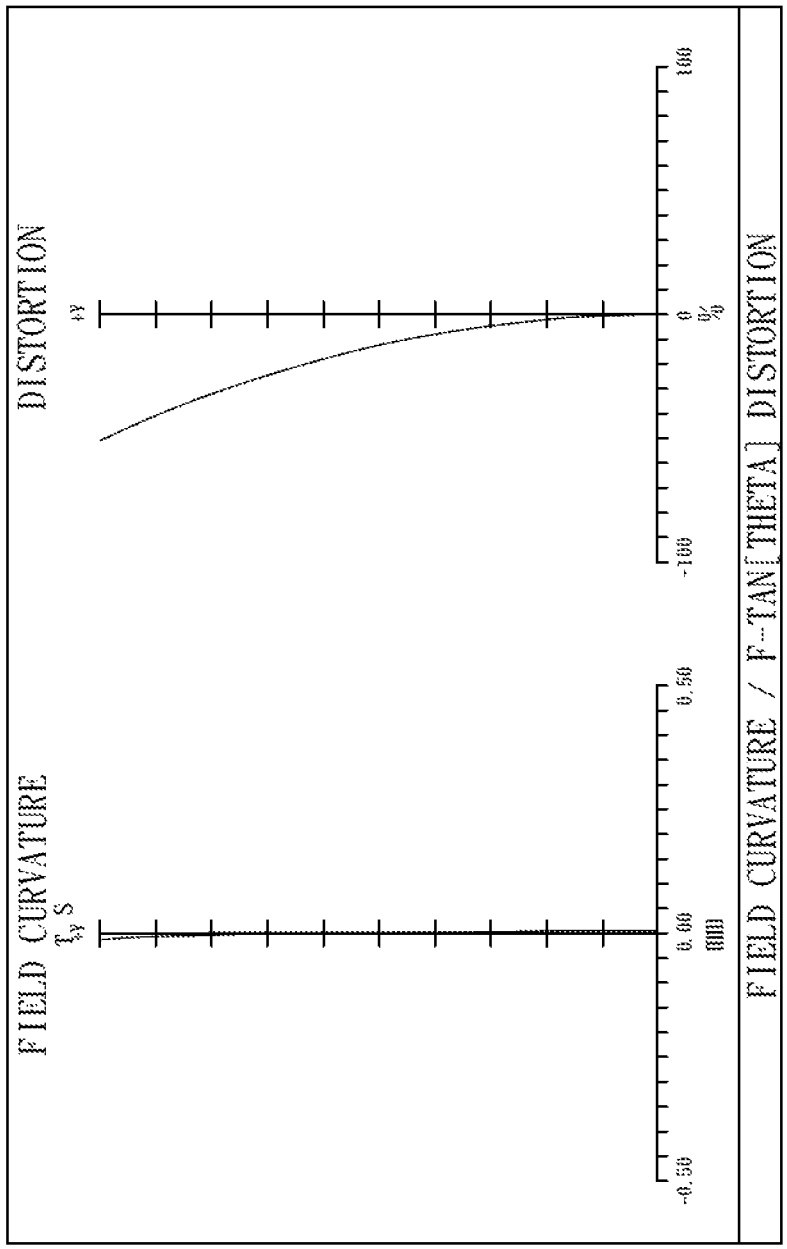
FIG. 2B is a diagram showing the field curvature and the distortion of the lens module in accordance with the second embodiment of the present invention.

At this point, the absolute value of the ratio of the focal length ff of the first lens group G1 to the focal length fr of the second lens group G2 is 0.657, the ratio of the focal length f1 of the first lens 10 to the focal length f2 of the second lens 20 is 1.05, the ratio of a distance 1CT from the object side surface of the first lens 10 to the aperture ST along the optical axis L to a distance 2CT from the aperture ST to the image side surface of the sixth lens 60 along the optical axis L is 2.43, the value of $$\frac{f}{f3} + \frac{f}{f4}$$

is 0.731, the value of $$\frac{\frac{f4}{V4} + \left|\frac{f5}{V5}\right|}{f}$$

is 0.153, the value of $$\frac{\left|\frac{f5}{V5}\right| + \frac{f6}{V6}}{f}$$

is 0.144, the value of $$\left|\frac{f}{ff}\right|$$

is 0.89, the value of $$\frac{G12}{R2}$$

is 0.62, so that the six-piece wide-angle lens module 1 has smaller aberration, chromatic aberration, field curvature, less stray light, the athermalized characteristic, and can achieve the result of wide-angle, large-aperture and miniature image pickup lens, balance the effect of tolerance, increase the yield, compensate the defocus which caused by temperature change, in which the diagram of the lateral chromatic aberration is shown as FIG. 2A, and diagram of the field curvature and the distortion of the lens module is shown as FIG. 2B.

Figure 3:
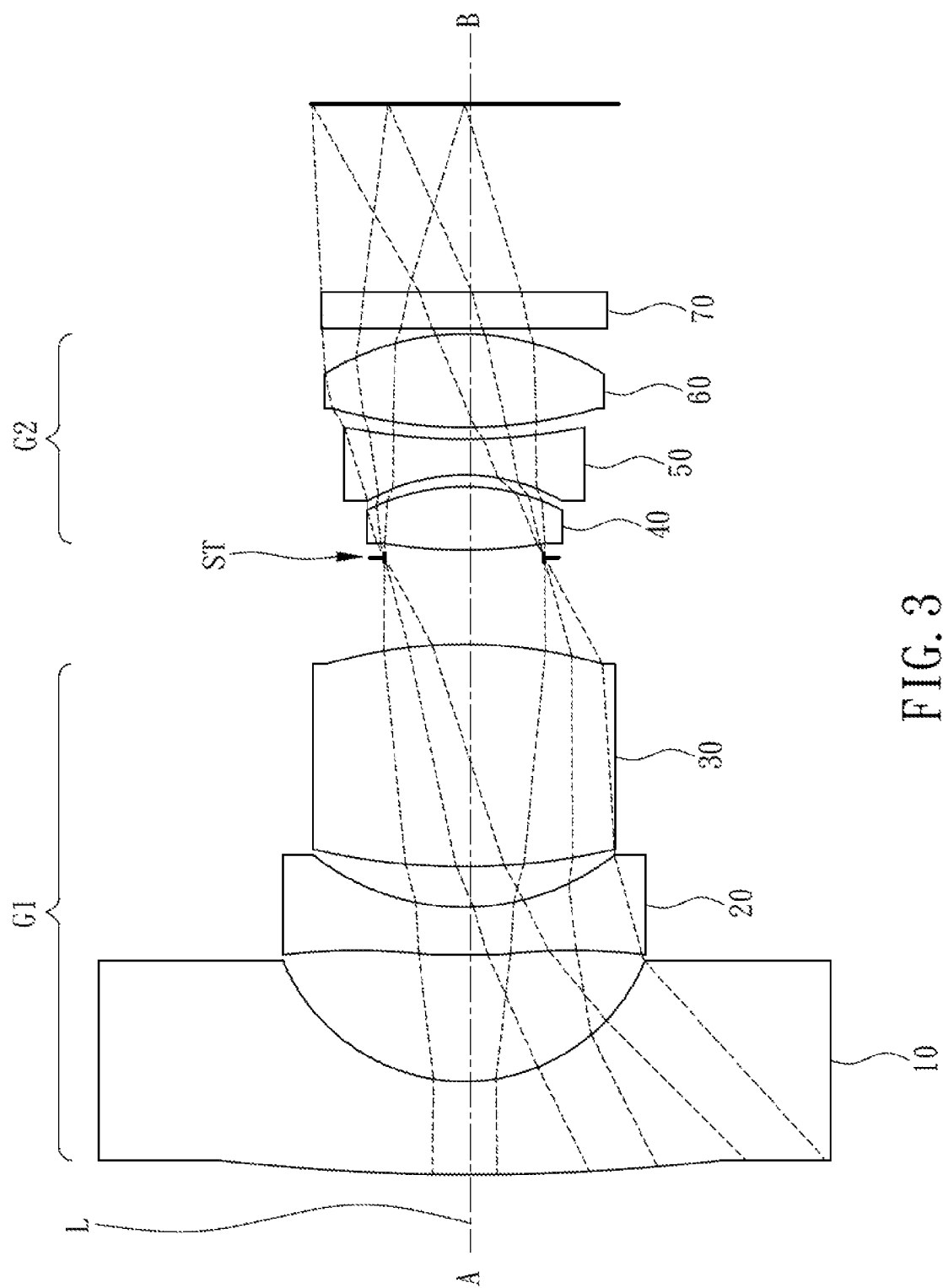
FIG. 3 is a schematic view of the third embodiment of the present invention, the dotted line means the light path.

Please refer to FIG. 3 for the third embodiment of the present invention, the lens configuration is similar to the first embodiment, the difference is: the sixth lens 60 has a convex image side surface, and the first lens group G1 has a positive focal length.

The optical feature data of the six-piece wide-angle lens module 1 in accordance with the third embodiment are listed in Table 5:

TABLE 5

| | Lens | Surface | Radius | Thickness | Nd | Vd | Focal length | Group focal length |
|---|---|---|---|---|---|---|---|---|
| First lens group | First lens | Object surface | 29.74 | 1.77 | 1.54 | 56.07 | −5.64 | 45.7 |
| | | Image surface | 2.69 | 2.37 | | | | |
| | Second lens | Object surface | 18.69 | 0.92 | 1.54 | 56.07 | −5.99 | |
| | | Image surface | 2.7 | 0.78 | | | | |
| | Third lens | Object surface | 9.61 | 4.22 | 1.81 | 34.97 | 5.5 | |
| | | Image surface | −6.63 | 1.66 | | | | |
| | Aperture | | ∞ | 0.17 | | | | |
| Second lens group | Fourth lens | Object surface | 7.2 | 1.17 | 1.54 | 56.07 | 3.72 | 5.19 |
| | | Image surface | −2.6 | 0.23 | | | | |
| | Fifth lens | Object surface | −2.13 | 0.7 | 1.65 | 23.53 | −2.73 | |
| | | Image surface | 11.32 | 0.21 | | | | |
| | Sixth lens | Object surface | 5.24 | 1.76 | 1.54 | 56.07 | 3.86 | |
| | | Image surface | −3.02 | 0.1 | | | | |
| | Plate glass | Object surface | ∞ | 0.7 | 1.52 | 64.17 | | |
| | | Image surface | ∞ | 3.56 | | | | |

In the third embodiment, all the object sides and the image sides of the first lens 10, the second lens 20, the fourth lens 40, the fifth lens 50 and the sixth lens 60 are aspheric surfaces, whose shapes satisfy the following formula:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

wherein z is a value of a reference position with respect to a vertex of surface along an the optical axis L, c is a reciprocal of a radius of curvature of the surface, h is a radial coordinate measured perpendicularly from the optical axis L, k is a conic constant, A is a coefficient of fourth-order aspheric surface, B is a coefficient of sixth-order aspheric surface, C is a coefficient of eighth-order aspheric surface, D is a coefficient of tenth-order aspheric surface, E is a coefficient of twelfth-order aspheric surface, F is a coefficient of fourteenth-order aspheric surface, and G is a coefficient of sixteenth-order aspheric surface.

The coefficients of the aspheric surface in the third embodiment are listed in Table 6:

TABLE 6

| Lens | Surface | k | A | B | C | D | E | F | G |
|---|---|---|---|---|---|---|---|---|---|
| First lens | Object surface | 0 | −0.000127 | −0.000013 | 0 | 0 | 0 | 0 | 0 |
| | Image surface | −3.40987 | 0.023355 | −0.002027 | 0.000331 | −0.000031 | 0.000001 | 0 | 0 |
| Second lens | Object surface | 0 | 0.00172 | −0.002038 | 0.000271 | −0.000013 | 0 | 0 | 0 |
| | Image surface | 0 | −0.004788 | −0.003853 | 0.000715 | −0.000058 | 0 | 0 | 0 |
| Fourth lens | Object surface | 0 | −0.002507 | −0.001624 | 0.000966 | −0.000428 | −0.000006 | −0.000001 | −0.000001 |
| | Image surface | 0 | 0.029761 | −0.015616 | 0.006313 | −0.001234 | −0.000006 | −0.000004 | −0.000003 |
| Fifth lens | Object surface | −0.16614 | 0.06984 | −0.046218 | 0.022608 | −0.005398 | 0.000408 | −0.000002 | −0.000002 |
| | Image surface | 0 | 0.031558 | −0.032077 | 0.015863 | −0.00364 | 0.000297 | 0.000001 | 0 |
| Sixth lens | Object surface | 0 | −0.004599 | −0.008099 | 0.004889 | −0.000948 | 0.000056 | 0 | 0 |
| | Image surface | −8.51986 | −0.032684 | 0.010559 | −0.00289 | 0.000532 | −0.000038 | 0 | 0 |

Subject to the afore-mentioned design, the total focal length f of the present embodiment is 2.08 mm, the total length TTL thereof is 20.32 mm, the angle of view is 150 degrees, and the f-number is 2.0.

Figure 3A:
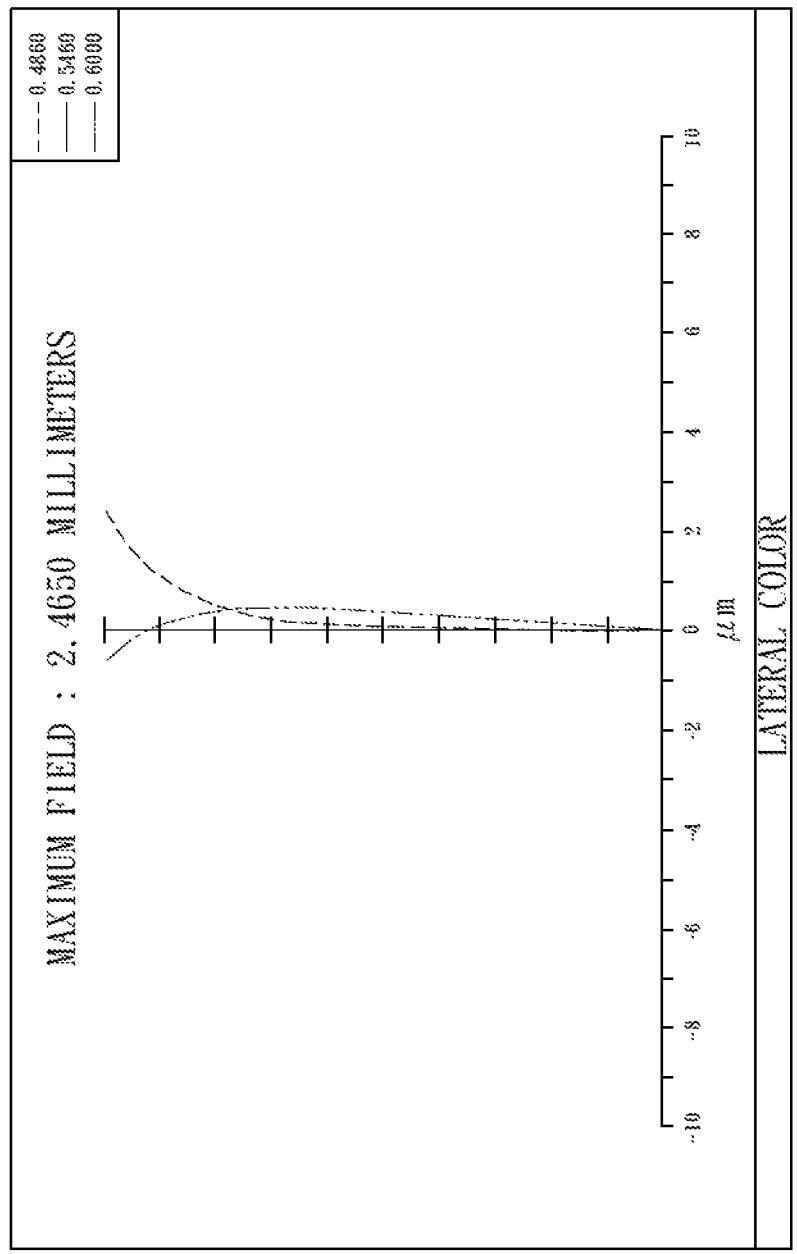
FIG. 3A is a diagram showing the lateral chromatic aberration of the lens module in accordance with the third embodiment of the present invention.
Figure 3B:
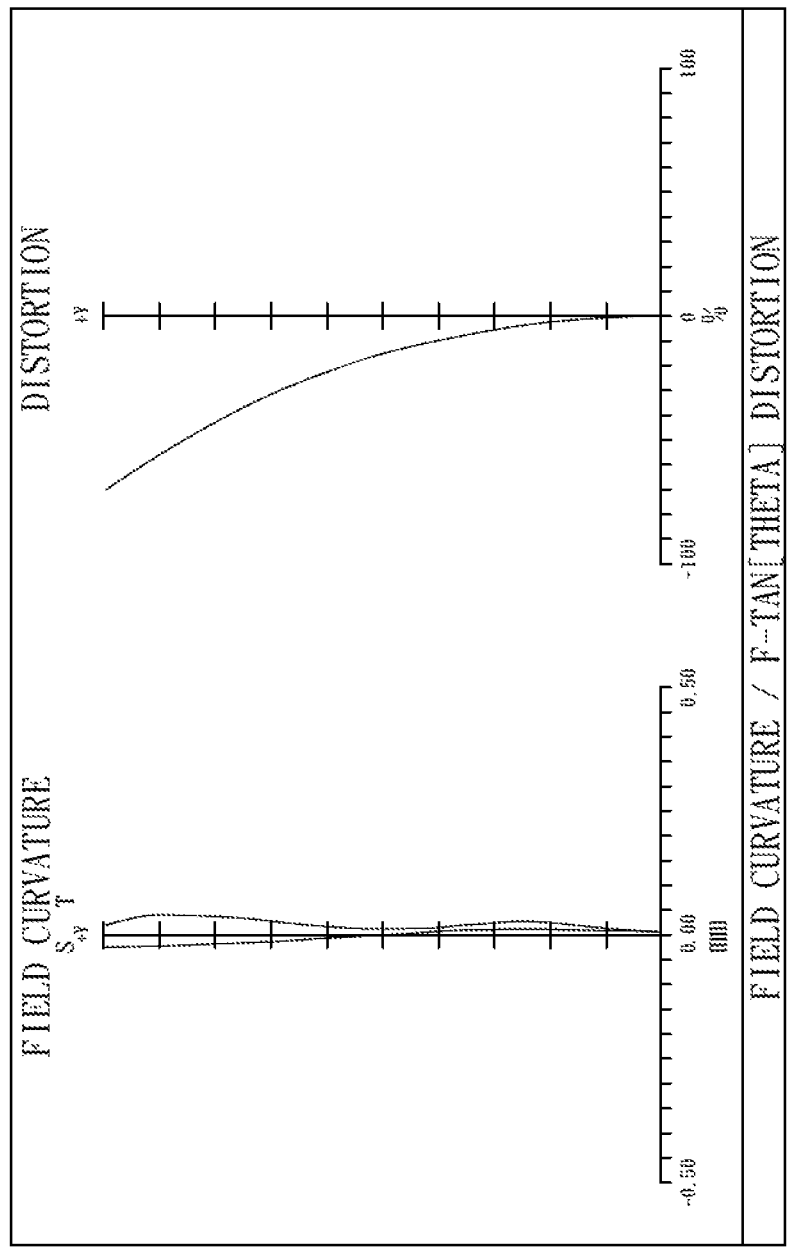
FIG. 3B is a diagram showing the field curvature and the distortion of the lens module in accordance with the third embodiment of the present invention.

At this point, the absolute value of the ratio of the focal length f of the first lens group G1 to the focal length fr of the second lens group G2 is 8.805, the ratio of the focal length f1 of the first lens 10 to the focal length f2 of the second lens 20 is 0.942, the ratio of a distance 1CT from the object side surface of the first lens 10 to the aperture ST along the optical axis L to a distance 2CT from the aperture ST to the image side surface of the sixth lens 60 along the optical axis L is 2.764, the value of $$\frac{f}{f3} + \frac{f}{f4}$$

is 0.937, the value of $$\frac{\frac{f4}{V4} + \left|\frac{f5}{V5}\right|}{f}$$

is 0.088, the value of $$\frac{\left|\frac{f5}{V5}\right| + \frac{f6}{V6}}{f}$$

is 0.089, the value of $$\left|\frac{f}{ff}\right|$$

is 0.046, the value of $$\frac{G12}{R2}$$

is 0.88, so that the six-piece wide-angle lens module 1 has smaller aberration, chromatic aberaton, field curvature, less stray light, the athermalized characteristic, and can achieve the result of wide-angle, large-aperture and miniature image pickup lens, balance the effect of tolerance, increase the yield, compensate the defocus which caused by temperature change, in which the diagram of the lateral chromatic aberration is shown as FIG. 3A, and diagram of the field curvature and the distortion of the lens module is shown as FIG. 3B.

Figure 4:
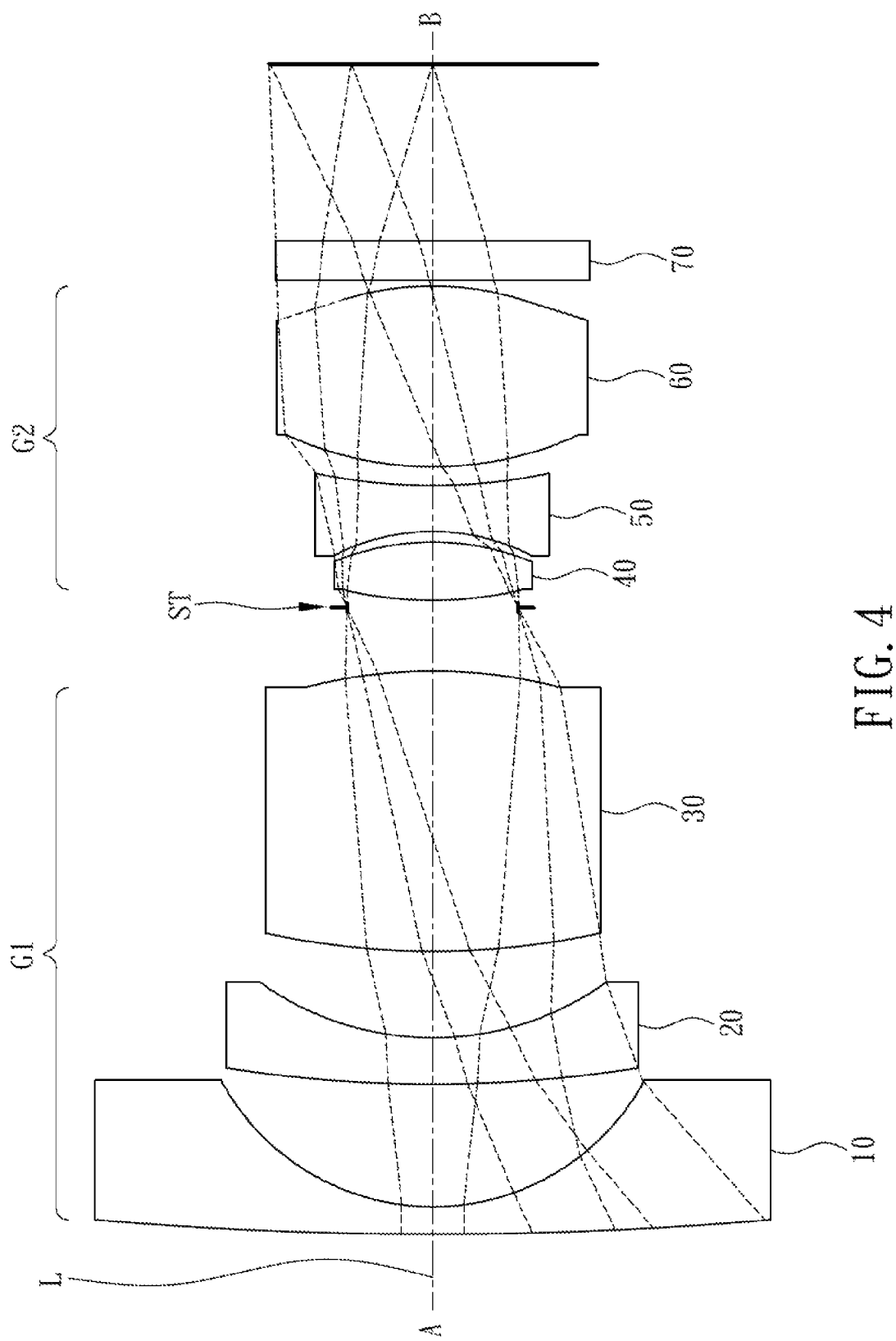
FIG. 4 is a schematic view of the fourth embodiment of the present invention, the dotted line means the light path.

Please refer to FIG. 4 for the fourth embodiment of the present invention, the lens configuration is similar to the first embodiment, the difference is: the sixth lens 60 has a convex image side surface, and the first lens group G1 has a positive focal length.

The optical feature data of the six-piece wide-angle lens module 1 in accordance with the fourth embodiment are listed in Table 7:

TABLE 7

|  | Lens | Surface | Radius | Thickness | Nd | Vd | Focal length | Group focal length |
|---|---|---|---|---|---|---|---|---|
| First lens group | First lens | Object surface | 49.68 | 0.5 | 1.54 | 56.07 | −5.13 | 22.99 |
|  |  | Image surface | 2.6 | 2.21 |  |  |  |  |
|  | Second lens | Object surface | 13.43 | 0.83 | 1.54 | 56.07 | −9.11 |  |
|  |  | Image surface | 3.5 | 1.59 |  |  |  |  |
|  | Third lens | Object surface | 9.4 | 5.03 | 1.64 | 23.53 | 6.9 |  |
|  |  | Image surface | −6.66 | 1.18 |  |  |  |  |
|  | Aperture |  | ∞ | 0.12 |  |  |  |  |
| Second lens group | Fourth lens | Object surface | 5.5 | 1.06 | 1.52 | 58.9 | 4.01 | 5.36 |
|  |  | Image surface | −3.13 | 0.19 |  |  |  |  |
|  | Fifth lens | Object surface | −2.28 | 0.85 | 1.64 | 23.53 | −2.92 |  |
|  |  | Image surface | 12.49 | 0.33 |  |  |  |  |
|  | Sixth lens | Object surface | 4.85 | 3.26 | 1.54 | 56.07 | 4.17 |  |
|  |  | Image surface | −3.17 | 0.1 |  |  |  |  |
|  | Plate glass | Object surface | ∞ | 0.7 | 1.52 | 64.17 |  |  |
|  |  | Image surface | ∞ | 3.22 |  |  |  |  |

In the fourth embodiment, all the object sides and the image sides of the first lens 10, the second lens 20, the third lens 30, the fifth lens 50 and the sixth lens 60 are aspheric surfaces, whose shapes satisfy the following formula:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

wherein z is a value of a reference position with respect to a vertex of surface along an the optical axis L, c is a reciprocal of a radius of curvature of the surface, h is a radial coordinate measured perpendicularly from the optical axis L, k is a conic constant, A is a coefficient of fourth-order aspheric surface, B is a coefficient of sixth-order aspheric surface, C is a coefficient of eighth-order aspheric surface, D is a coefficient of tenth-order aspheric surface, E is a coefficient of twelfth-order aspheric surface, F is a coefficient of fourteenth-order aspheric surface, and G is a coefficient of sixteenth-order aspheric surface.

The coefficients of the aspheric surface in the fourth embodiment are listed in Table 8:

TABLE 8

| Lens | Surface | k | A | B | C | D | E | F | G |
|---|---|---|---|---|---|---|---|---|---|
| First lens | Object surface | 0 | −0.01014 | 0.000013 | 0 | 0 | 0 | 0 | 0 |
| | Image surface | −1.77998 | 0.006286 | −0.00026 | 0.000027 | −0.000002 | 0 | 0 | 0 |
| Second lens | Object surface | 0 | 0.000227 | −0.000651 | 0.000084 | −0.000001 | 0 | 0 | 0 |
| | Image surface | 0.136237 | −0.000491 | −0.001207 | 0.000131 | 0 | 0 | 0 | 0 |
| Third lens | Object surface | 0 | −0.00084 | −0.000049 | −0.000003 | 0 | 0 | 0 | 0 |
| | Image surface | 0 | −0.000304 | 0.000075 | 0.000031 | 0.000001 | −0.000002 | −0.000001 | 0 |
| Fifth lens | Object surface | 0.078336 | 0.03011 | −0.012873 | 0.005859 | −0.001022 | 0.000016 | 0.000007 | 0.000003 |
| | Image surface | 0 | 0.021278 | −0.012431 | 0.004302 | −0.000519 | 0 | 0 | 0 |
| Sixth lens | Object surface | 0 | −0.000814 | −0.002337 | 0.001172 | −0.000143 | 0.000003 | 0 | 0 |
| | Image surface | 7.19038 | −0.016806 | 0.004475 | −0.000677 | 0.00007 | −0.000003 | 0 | 0 |

Subject to the afore-mentioned design, the total focal length f of the present embodiment is 1.92 mm, the total length TTL thereof is 21.17 mm, the angle of view is 116 degrees, and the f-number is 2.0.

Figure 4A:
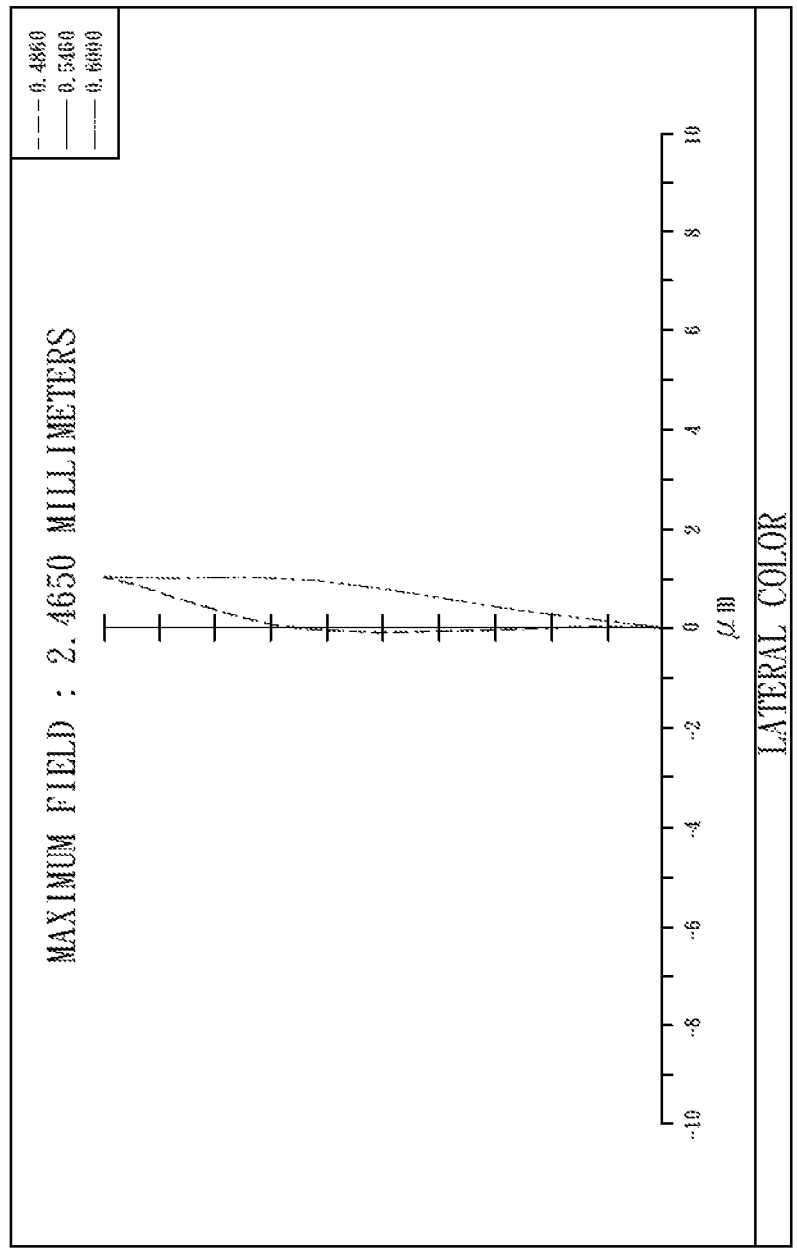
FIG. 4A is a diagram showing the lateral chromatic aberration of the lens module in accordance with the fourth embodiment of the present invention.
Figure 4B:
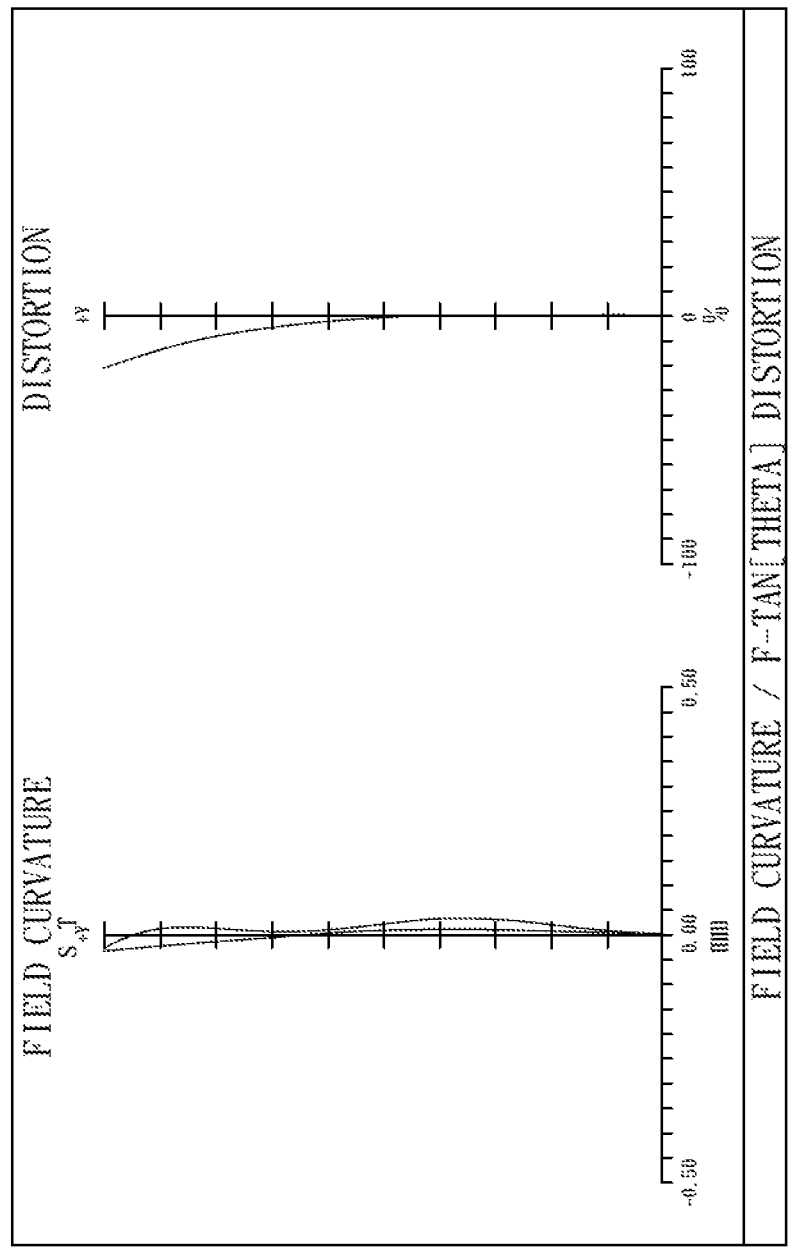
FIG. 4B is a diagram showing the field curvature and the distortion of the lens module in accordance with the fourth embodiment of the present invention.

At this point, the absolute value of the ratio of the focal length f of the first lens group G1 to the focal length fr of the second lens group G2 is 4.289, the ratio of the focal length f1 of the first lens 10 to the focal length 12 of the second lens 20 is 0.563, the ratio of a distance 1CT from the object side surface of the first lens 10 to the aperture ST along the optical axis L to a distance 2CT from the aperture ST to the image side surface of the sixth lens 60 along the optical axis L is 1.952, the value of $$\frac{f}{f3} + \frac{f}{f4}$$

is 0.757, the value of $$\frac{\frac{f4}{V4} + \left|\frac{f5}{V5}\right|}{f}$$

is 0.1, the value of $$\frac{\left|\frac{f5}{V5}\right| + \frac{f6}{V6}}{f}$$

is 0.103, the value of $$\left|\frac{f}{ff}\right|$$

is 0.084, the value of $$\frac{G12}{R2}$$

is 0.85, so that the six-piece wide-angle lens module 1 has smaller aberration, chromatic aberration, field curvature, less stray light, the athermalized characteristic, and can achieve the result of wide-angle, large-aperture and miniature image pickup lens, balance the effect of tolerance, increase the yield, compensate the defocus which caused by temperature change, in which the diagram of the lateral chromatic aberration is shown as FIG. 4A, and diagram of the field curvature and the distortion of the lens module is shown as FIG. 4B.

The invention described above is capable of many modifications, and may vary. Any such variations are not to be regarded as departures from the spirit of the scope of the invention, and all modifications which would be obvious to someone with the technical knowledge are intended to be included within the scope of the following claims.

What is claimed is:

1. A six-piece wide-angle lens module, comprising, in a sequence from an object side to an image side, a first lens group, substantially consisting of a first lens having a negative refractive power, a second lens having a negative refractive power and a third lens having a positive refractive power, each lens having an object side surface facing the object side and an image side surface facing the image side, the first lens being a meniscus lens having a convex object side surface, the second lens having a concave image side surface, the third lens having a convex object side surface;
an aperture; and
a second lens group, substantially consisting of a fourth lens having a positive refractive power, a fifth lens having a negative refractive power, and a sixth lens having a positive refractive power, each lens having an object side surface facing the object side and an image side surface facing the image side, the fourth lens being a biconvex lens, the fifth lens having a concave image side surface, the sixth lens having a convex object side surface, and the second lens group having a positive focal length;
wherein the six-piece wide-angle lens module satisfies the following relationship:

$$0.65 \le \left|\frac{ff}{fr}\right| \le 8.81;$$

$$0.07 \le \frac{\left|\frac{f5}{V5}\right| + \frac{f6}{V6}}{f} \le 0.15;$$

wherein ff is a focal length of the first lens group, fr is a focal length of the second lens group, f is a focal length of the six-piece wide-angle lens module, f5 is a focal length of the fifth lens, f6 is a focal length of the sixth lens, V5 is an Abbe number of the fifth lens, and V6 is an Abbe number of the sixth lens.

2. The six-piece wide-angle lens module of claim 1, further satisfying the following relationship:

$$0.52 \le \frac{f1}{f2} \le 1.06;$$

wherein f1 is a focal length of the first lens, and f2 is a focal length of the second lens.

3. The six-piece wide-angle lens module of claim 1, wherein the second lens has a convex object side surface.

4. The six-piece wide-angle lens module of claim 1, wherein the second lens has a concave object side surface.

5. The six-piece wide-angle lens module of claim 1, wherein the third lens has a convex image side surface.

6. The six-piece wide-angle lens module of claim 1, wherein the third lens has a concave image side surface.

7. The six-piece wide-angle lens module of claim 1, wherein the fifth lens has a convex object side surface.

8. The six-piece wide-angle lens module of claim 1, wherein the fifth lens has a concave object side surface.

9. The six-piece wide-angle lens module of claim 1, wherein the sixth lens has a convex image side surface.

10. The six-piece wide-angle lens module of claim 1, wherein the sixth lens has a concave image side surface.

11. The six-piece wide-angle lens module of claim 1, wherein the focal length of the first lens group is positive.

12. The six-piece wide-angle lens module of claim 1, wherein the focal length of the first lens group is negative.

13. The six-piece wide-angle lens module of claim 1, further satisfying the following relationship:

$$1.775 \le \frac{1CT}{2CT} \le 2.48;$$

wherein 1CT is a distance from the object side surface of the first lens to the aperture along an optical axis, and 2CT is a distance from the aperture to the image side surface of the sixth lens along the optical axis.

14. The six-piece wide-angle lens module of claim 1, further satisfying the following relationship:

$$0.73 \le \frac{f}{f3} + \frac{f}{f4} \le 0.94;$$

wherein f is a focal length of the six-piece wide-angle lens module, f3 is a focal length of the third lens, and f4 is a focal length of the fourth lens.

15. The six-piece wide-angle lens module of claim 1, further satisfying the following relationship:

$$0.07 \le \frac{\frac{f4}{V4} + \left|\frac{f5}{V5}\right|}{f} \le 0.16;$$

wherein f is a focal length of the six-piece wide-angle lens module, f4 is a focal length of the fourth lens, f5 is a focal length of the fifth lens, V4 is an Abbe number of the fourth lens, and V5 is an Abbe number of the fifth lens.

16. The six-piece wide-angle lens module of claim 1, further satisfying the following relationship:

$$0.045 \le \left|\frac{f}{ff}\right| \le 0.9;$$

wherein f is a focal length of the six-piece wide-angle lens module.

17. The six-piece wide-angle lens module of claim 1, further satisfying the following relationship:

$$0.61 \le \frac{G12}{R2} \le 0.89;$$

wherein G12 is a distance between the first lens and the second lens along an optical axis, R2 is a radius of curvature of the image side surface of the first lens.

* * * * *